United States Patent
Chiappetta (10) Patent No.: US 7,018,111 B2
(45) Date of Patent: Mar. 28, 2006

(54) OPTICAL FIBER AMPLIFIER WITH REDUCED NOISE

(75) Inventor: Mark C. Chiappetta, Norristown, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 51 days.

(21) Appl. No.: 10/747,549

(22) Filed: Dec. 29, 2003

(65) Prior Publication Data

US 2005/0147413 A1 Jul. 7, 2005

(51) Int. Cl.
*G02B 6/04* (2006.01)

(52) U.S. Cl. ............... 385/89; 104/115; 359/341.1; 372/6

(58) Field of Classification Search ............ 385/89, 385/104, 114–115, 155, 123–128; 398/13, 398/20, 28, 37, 115, 11
See application file for complete search history.

(56) References Cited

U.S. PATENT DOCUMENTS

| | | | | | |
|---|---|---|---|---|---|
| 4,955,685 | A | * | 9/1990 | Garman | 359/341.32 |
| 5,373,526 | A | * | 12/1994 | Lam et al. | 372/69 |
| 6,400,871 | B1 | * | 6/2002 | Minden | 385/39 |
| 6,826,335 | B1 | * | 11/2004 | Grudinin et al. | 385/43 |

* cited by examiner

*Primary Examiner*—Brian Healy
*Assistant Examiner*—Christopher M. Kalivoda
(74) *Attorney, Agent, or Firm*—Duane Morris LLP (57) ABSTRACT

A light amplifier includes a source of multiple light beams, each modulated with the same information, and a plurality of light amplifying optical fibers, each amplifying one of the light beams. The amplified light from each amplifying fiber is converted to electric form, and the electrical signals are summed to add the information and average the noise. In one embodiment, the bundle of fibers is twisted as it is wound about a cylinder, to average the compressive and tension forces on the fibers of the bundle. In another embodiment, a common cladding surrounds a bundle of fibers.

15 Claims, 6 Drawing Sheets

OPTICAL FIBER AMPLIFIER WITH REDUCED NOISE

FIELD OF THE INVENTION

This invention relates to optical fiber amplifiers, and more particularly to such amplifiers with reduced noise.

BACKGROUND OF THE INVENTION

Figure 1A:
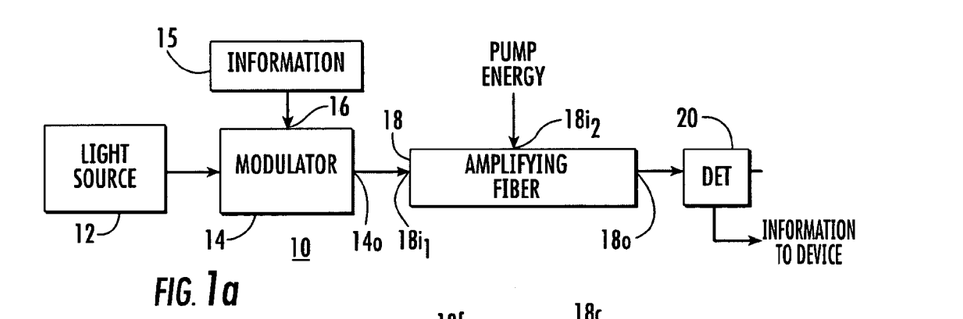
FIG. 1a is a simplified diagram in block and schematic form, illustrating a communication system with a light modulator, an amplifying optical fiber, and a detector.

FIG. 1a illustrates a communication system 10 including a light source 12 driving a light modulator 14, which receives data or information at an input port 16. Modulator 14 modulates the light from source 12 in known manner to produce modulated light at an output port 14o. The modulated light is applied to a first input port 18i1 of an amplifying light fiber illustrated as a block 18. Amplifying light fiber 18 receives pump energy at a second input port 18i2. In response to the applied modulated light and the pump energy, amplifying light fiber 18 produces amplified modulated light at an output port 18o. This amplified modulated light may be processed in any manner, and may be transmitted by way of a conventional nonamplifying fiber to a remote location. Ultimately, the amplified modulated light is applied to a light-to-electric converter, such as a detector (DET) illustrated as a block 20, to produce an electrical signal representative of the information originally modulated onto the light beam.

Those skilled in the art know that amplifying light fibers may be in the form of doped optical fibers, and that the gain per unit length of such amplifying optical fibers is relatively low. In order to obtain sufficient amplification for various purposes, the lengths of amplifying optical fiber must be relatively long. The lengths of optical fiber may be long enough so that it is convenient to wind the fiber around a mandrel, such as around a right circularly cylindrical mandrel.

Those skilled in the art also know that the amplification of signal is always attended by unwanted noise, and that it is desirable to reduce the noise whenever possible. The noise associated with the amplifying optical fiber 18 of FIG. 1a includes shot noise, which tends to be random.

Figures 1B, 2:
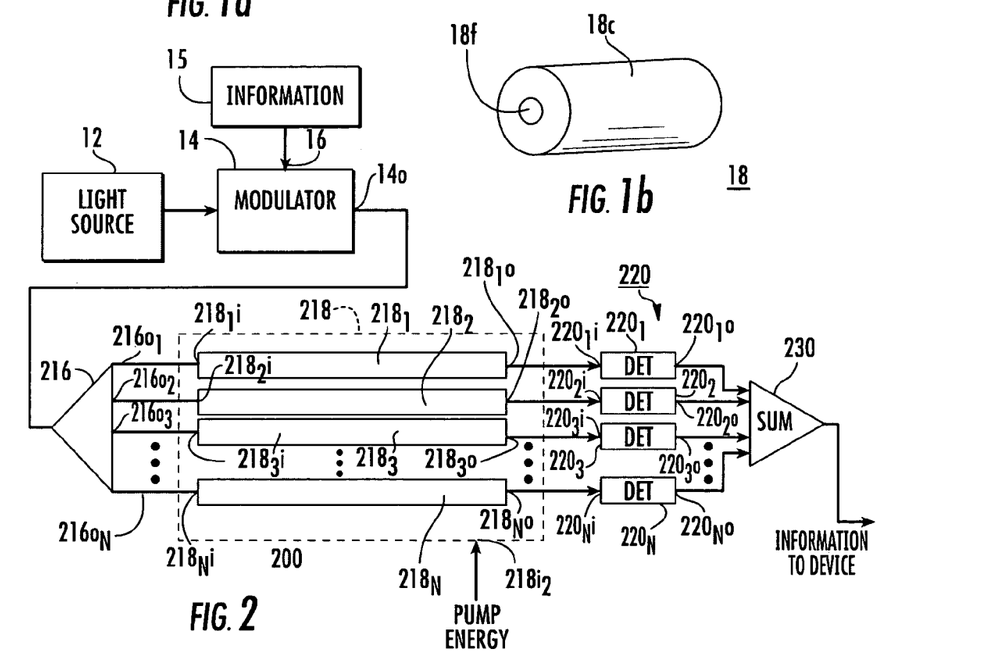

FIG. 1b is a simplified perspective or isometric view of a portion of an amplifying light fiber which may be used in the arrangement of FIG. 1a. In FIG. 1b, the amplifying optical fiber is designated 18f, and the fiber 18f is surrounded by a cladding 18c. The amplifying optical fiber may as known be doped with erbium (Er), or with any other matter to achieve gain.

Improved light amplification arrangements are desired.

SUMMARY OF THE INVENTION

A communication system according to an aspect of the invention is for transmitting information from a source of information to a utilization device. The system comprises a source of first plurality of light beams, each of which light beams carries the same information. The system also includes a plurality of amplifying optical fibers. Each of the amplifying optical fibers defines an input port coupled to one of the light beams of the source of plural light beams, for receiving and propagating a light beam. Each of the plurality of optical fibers also defines an output port at which the propagating light beam is manifested. The system includes a plurality, equal to the first plurality, of light-to-electric converters or detectors. Each of the light-to-electric converters includes a light input port coupled to an output port of a corresponding one of the amplifying optical fibers, for receiving the manifested light therefrom, and also includes an electrical output port, for producing at the electrical output port an electrical signal including the information carried on the light beam of the associated amplifying optical fiber and also including noise attributable to the amplification, which noise differs from fiber to fiber. The system further includes electrical summing means coupled to the electrical output ports of each of the detectors, for summing together the electrical signals including the information and the noise, for thereby tending to average the noise for improving the signal-to-noise ratio of the amplified signal.

In one embodiment of this aspect of the invention, the plural light beams comprise mutually parallel light beams. The plural light beams may be generated from a single modulated light beam by splitting the modulated light beam.

According to another aspect of the invention, the plural optical fibers are joined to form a tape or a bundle. If the optical fibers are in tape form, they are spirally wrapped, and if in bundle form, are wrapped in a manner which tends to equalize compressive and tension forces among the optical fibers of the bundle. In one version of the bundle, the optical fibers are wrapped about a cylinder, whether an imaginary cylinder or a cylindrical mandrel. In a preferred version of this aspect of the invention, the wrapping of the bundle about a cylinder has the property of a selected rate of fiber bundle twist per turn about the cylinder, and the most preferred version has a wrapping of the bundle of fibers at a rate greater than about one twist per turn about the cylinder.

According to a further aspect of the invention, each of the bundles of optical fibers comprises a bundle, group or variety of core-clad combinations, and each of the core-clad combinations comprises an optical core capable of gain and a cladding through which pump energy can be introduced to the core. According to a yet further aspect of the invention, each of the bundles of optical fiber comprises a bundle of spaced-apart cores enveloped in a common cladding to support injection of pump energy to the bundle of spaced-apart cores. The injection may be end injection, and the end injection of pump energy may be accomplished at plural locations along the cladding. The plural locations may be the two ends of the cladding or common cladding.

BRIEF DESCRIPTION OF THE DRAWING

FIG. 1b is a simplified illustration of a portion of an amplifying optical fiber which may be used in the arrangement of FIG. 1a;

FIG. 2 is a simplified diagram in block and schematic form, illustrating a communication system according to an aspect of the invention;

DESCRIPTION OF THE INVENTION

In FIG. 2, elements corresponding to those of FIG. 1*a* are designated by like reference alphanumerics. FIG. 2 illustrates a communication system 200 according to an aspect of the invention. In FIG. 2, an unmodulated light beam from source 12 is coupled to a modulator 14 as in FIG. 1*a*, and information signals are applied to input terminal 16 of the modulator. Modulator 14 modulates the information onto the light beam, and produces the modulated light beam at output port 14*o*. The modulated light beam produced by modulator 14 of FIG. 2 is applied to a light splitter or divider illustrated as 216, to divide the incident modulated light beam into plural modulated light beams at the output of the splitter 216. As illustrated in FIG. 2, splitter 216 has output ports 216*o*1, 216*o*2, 216*o*3, . . . , 216*o*N. Light splitter 216 may include a cascade of partially-reflecting mirrors, or it may include a "star" coupler, both known in the art for splitting light into plural beams. The light from splitter 216 of FIG. 2 is coupled, either spatially directly (that is, by direct radiation), or by means of optical fibers (not illustrated) to the individual input ports $218_1 i$, $218_2 i$, $218_3 i$, . . . , $218_N i$ of individual amplifying fibers $218_1$, $218_2$, $218_3$, . . . , $218_N$ of a bundle 218 of amplifying optical fibers. The individual portions of the modulated light from splitter 216 are amplified in the amplifying optical fibers to which they are applied, with the aid of optical pump signals applied to the amplifying light fibers of bundle 218.

In the communication system of FIG. 2, amplified light signals with associated information modulation and noise appear at the output ports $218_1 o$, $218_2 o$, $218_3 o$, . . . $218_N o$ of individual amplifying fibers $218_1$, $218_2$, $218_3$, . . . , $218_N$ of bundle 218 of amplifying optical fibers. The information or signal portions of the modulated and amplified light signals appearing at the output ports $218_1 o$, $218_2 o$, $218_3 o$, . . . , $218_N o$ tend to be in-phase, but the noise components are generated randomly by each amplifying optical fiber, and tend to be in random phase. According to an aspect of the invention, the light signals produced at the individual output ports $218_1 o$, $218_2 o$, $218_3 o$, . . . , $218_N o$ of individual amplifying fibers $218_1$, $218_2$, $218_3$, . . . , $218_N$ are individually converted to electrical form by a plurality of light-to-electric converters, commonly referred to as "detectors," which may take the form of semiconductor diodes or other devices. More particularly, the amplified light signals produced at output ports $218_1 o$, $218_2 o$, $218_3 o$, . . . , $218_N o$ are individually applied to detectors $220_1$, $220_2$, $220_3$, . . . , $220_N$, for conversion into electrical signals. The electrical signals include a component related to the modulation signal or information, and a component related to the noise. The noise is averaged and the information is added by the use of a summing circuit or current adder circuit illustrated as 230. Since the information is in-phase, it adds on a voltage basis, while the noise is in random phase, and adds only on a power basis. This has the effect of improving the signal-to-noise ratio of the information signal recovered at the output of the communication system of FIG. 2 by comparison with that of the information signal recovered at the output of the system of FIG. 1.

Figure 3:
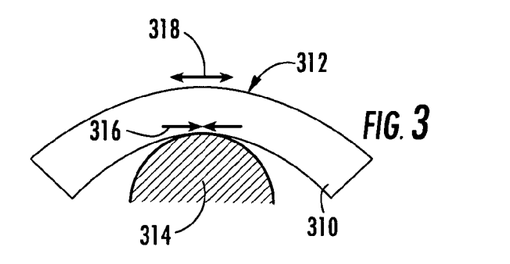
FIG. 3 is a representation of an optical fiber which is bent, to illustrate tension and compression in portions of the fiber.

FIG. 3 illustrates an optical fiber 310, such as the amplifying optical fiber of FIG. 1*b*, with a bend 312 along its length. The bend 312 may be simply imposed by outside forces, or it may result from being bent over a mandrel such as 314. As a result of the bend 312, compressive forces illustrated as 316 are generated in that portion of the optical fiber 310 adjacent mandrel 314, or in the absence of a mandrel, on the inside of the bend 312. For the same reason, tension forces illustrated as 318 appear on that portion of the fiber 310 bend 312 adjacent the exterior of the bend (remote from the mandrel 314). The compression may result in a slight increase in density of the optical fiber, and the tension in a slight decrease in density. It is believed that these changes in density of the optical fiber in turn affect the index of refraction, thereby affecting the velocity of propagation of the light in the optical fiber. In the case of a single optical fiber, however, the effect of bending may be viewed as resulting simply in an average velocity change of zero.

Figure 4:
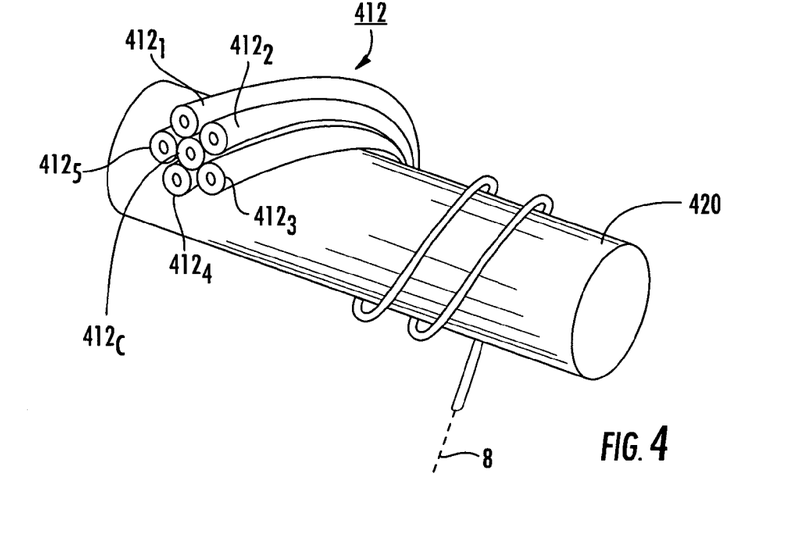
FIG. 4 illustrates a bundle of optical fibers wrapped in multiple turns around a circular cylinder.

In the case of a bundle of optical fibers, on the other hand, the effects of bending of the bundle may not average in the same manner. FIG. 4 illustrates a bundle 412 of six optical fibers, including a central fiber 412C and five peripheral fibers $412_1$, $412_2$, $412_3$, $412_4$, and $412_5$. As illustrated, the bundle 412 is wrapped in multiple turns around a circular cylinder 420 (which may be a theoretical cylinder as opposed to an actual mandrel or core). It will be clear that the illustrated wrapping will, by comparison with central fiber 412C, cause relative compression in fiber $412_4$ and tension in fibers $412_1$ and $412_2$. Fibers $412_3$ and $412_5$ may have compression or tension, depending on their exact locations. The simple winding illustrated in FIG. 4 always places fiber $412_4$ on the inside of the curve, in compression, and fibers $412_1$ and $412_2$ on the outside, in tension. As a result, the velocity of light propagation in optical fiber $412_4$ will be slower than that in reference fiber 412C, and the velocity of propagation of light in optical fibers $412_1$ and $412_2$ will be greater than that in reference fiber 412C. It should be noted that the bundle 412 of optical fibers may be sheathed with some kind of protective coat which tends to hold together the fibers of the bundle.

When the optical fibers of bundle 218 of FIG. 2 are in the form illustrated in FIG. 4 and the bundle is wound in order to make the length convenient to handle, it is to be expected that there will be differences in the velocities of propagation of light among the various fibers of the bundle. These differences in the velocity of propagation, in turn, result in different times of arrival at the bank 220 of detectors of FIG. 2 of the light modulated with the information signal. These different times of arrival, in turn, tend to adversely influence the summing of the information signal, and may reduce the signal-to-noise benefit of the arrangement of FIG. 2.

Figure 5:
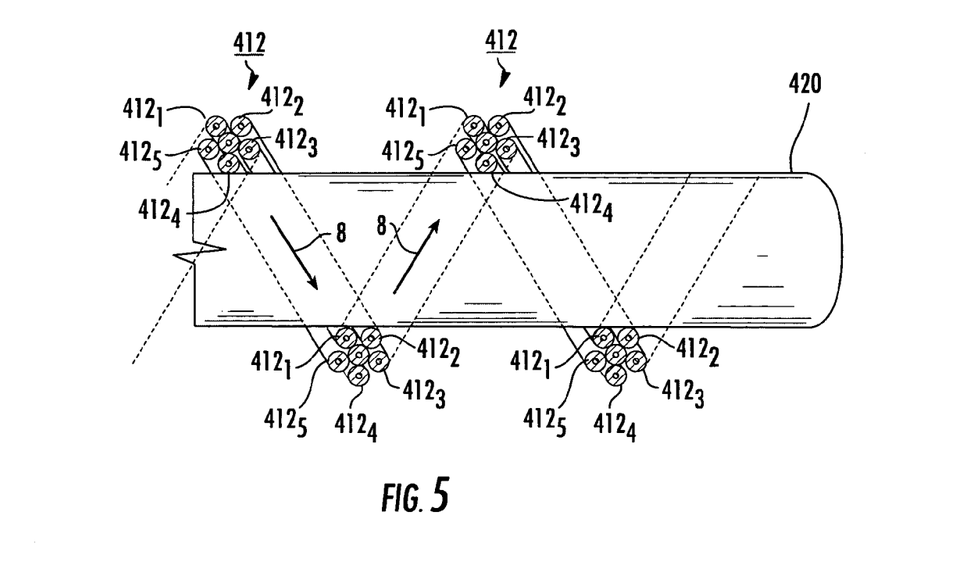
FIG. 5 is a cross-section of a cylinder wound with a bundle of optical fibers, similar to the bundle of FIG. 4, in which the bundle is twisted around its longitudinal axis.

According to another aspect of the invention, the bundle of optical fibers wound on the real or imaginary cylinder 420, as illustrated in FIG. 4, is twisted in a manner such as to compress and tension all of the fibers more or less evenly. FIG. 5 is a cross-section of a cylinder 520 wound with a bundle 412 of six optical fibers, similar to the bundle of FIG. 4, and including a central fiber 412C and five peripheral fibers $412_1$, $412_2$, $412_3$, $412_4$, and $412_5$. In FIG. 5, the bundle 412 is twisted around its longitudinal axis 8 with each turn of the bundle 412 around the cylinder 520. One complete twist for each turn of the bundle about the cylinder 520 corresponds to one-half twist for each half-turn around the cylinder 520. In FIG. 5, the half-twist of bundle 412 in association with each half-turn of the bundle about the cylinder 520 results in variation of the positions of the various fibers relative to the cylinder (and therefore relative to the center of curvature). More particularly, at locations illustrated as being at the top of the cylinder 520 in FIG. 5, fiber $412_4$ is adjacent the surface of the cylinder 520, and is subject to maximum relative compression, while at locations illustrated as being at the bottom of the cylinder 520, fiber $412_4$ is remote from the surface of the cylinder. Correspondingly, at locations illustrated as being at the top of cylinder 520 in FIG. 5, fibers $412_1$ and $412_2$ are most remote from the surface of cylinder 520, while at the bottom of cylinder 520, fibers $412_1$ and $412_2$ are adjacent the surface of cylinder 520. Therefore, at the top of cylinder 520 as illustrated in FIG. 5, fibers $412_1$, and $412_2$ are subject to relative tension, and at the bottom of the cylinder, to relative compression. The relative tension and compression engendered by the twist tend to equalize over a plurality of turns of the bundle 412 around the cylinder 520, and therefore tend to provide relatively constant velocity of propagation among the various optical fibers of the bundle 412. The relatively constant velocity of propagation of the fibers of the bundle, in turn, allows the summation of the information components of the light signals received by the detectors in the arrangement of FIG. 2.

Figure 6A:
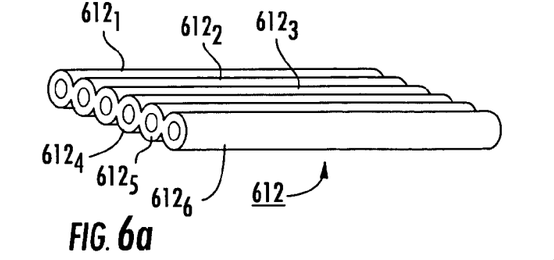
FIG. 6a illustrates a flat ribbon or tape form of bundle of optical fibers arrayed in a single row and a straight line.
Figures 6B, 6C, 7:
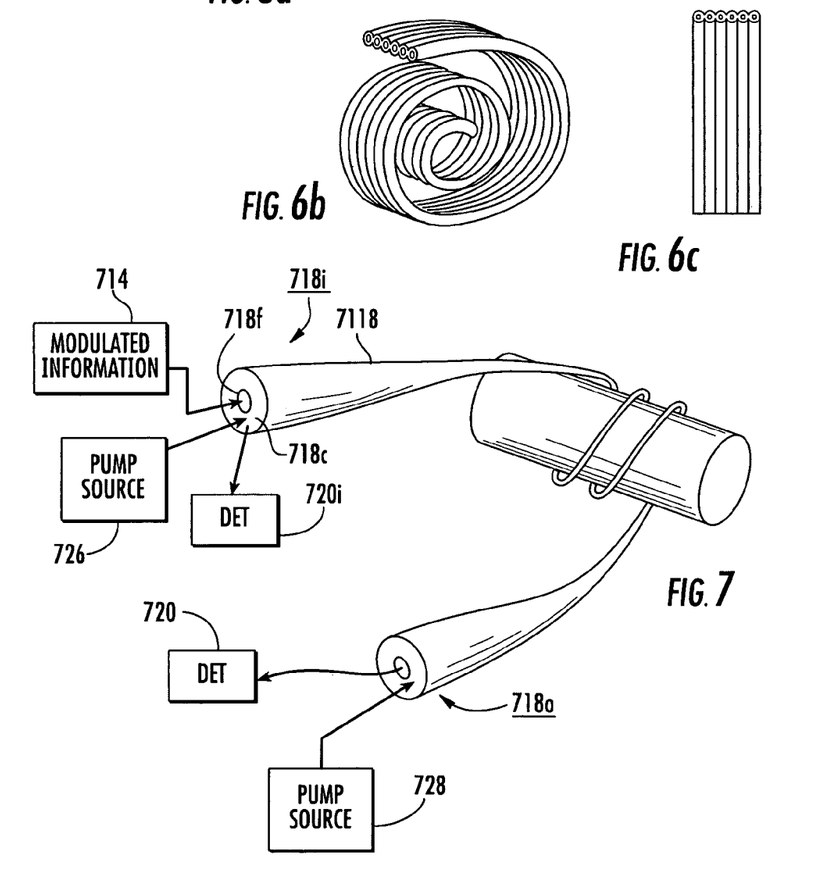
FIG. 6b is a perspective or isometric view of a nonhelical spiral winding of a flat bundle 612 of optical fibers.
FIG. 6*c* is a side elevation view of the spiral bundle of FIG. 6*b;*
FIG. 7 is a simplified illustration showing how pump energy can be coupled into an optical fiber from two ends.

FIG. 6a illustrates a flat ribbon or tape form of bundle of optical fibers. In FIG. 6a, the bundle 612 is illustrated as including six optical fibers $612_1$, $612_2$, $612_3$, $612_4$, $612_5$, and $612_6$ arrayed in a single row and a straight line. The bundle 612 is also subject to disparate compressive and tension forces among the various fibers when wound in a helical fashion around a cylindrical surface. According to an aspect of the invention, the bundle of optical fibers, when in a flat, ribbon or tape form, is wound in a nonhelical spiral fashion. FIG. 6b is a perspective or isometric view of a nonhelical spiral winding of a flat bundle 612 of optical fibers, and FIG. 6c is a side elevation view of the spiral bundle.

FIG. 7 is a simplified illustration showing how pump energy can be coupled into an optical fiber from two ends. In FIG. 7, an amplifying optical fiber 718 includes a doped fiber 718f and a cladding 718c. A source 714 of information-modulated light applies light to be amplified to the doped fiber 718f at an "input" end 718i of the amplifying optical fiber 718. A first pump light source 726 produces pump light and applies it to the cladding 718C at the input end 718i of the amplifying optical fiber. Those skilled in the art know that the pump light energy is transferred from the cladding 718C to the doped fiber 718f along the length of the structure, with the result that the amount of pump energy decreases with increasing distance from the "input" end 718i. Consequently, the cladding in those regions near the "output" end 718o of the amplifying optical fiber 718 may have less optical power than those regions near the input end 718i. It is possible to apply pump light energy to the output end of the amplifying optical fiber 718, as suggested by pump source 728 coupled to the cladding 718C at the output end of the fiber. The amplified information light signal appearing at the output end of the doped fiber 718f is applied to a detector 720, as explained in conjunction with FIGS. 1a and 2. A mirror (not illustrated in FIG. 7) may be associated with the input end 718i and output end 718o, and may be used to couple light from a single pump source, such as pump source 726, to both the input and output ends 718i and 718o of the cladding 718. A mirror (not illustrated) may be used to reflect light which enters exit end 718o of optical fiber 718 and exits amplifying optical fiber 718f at input end 718i to a further detector 720i.

Figure 8:
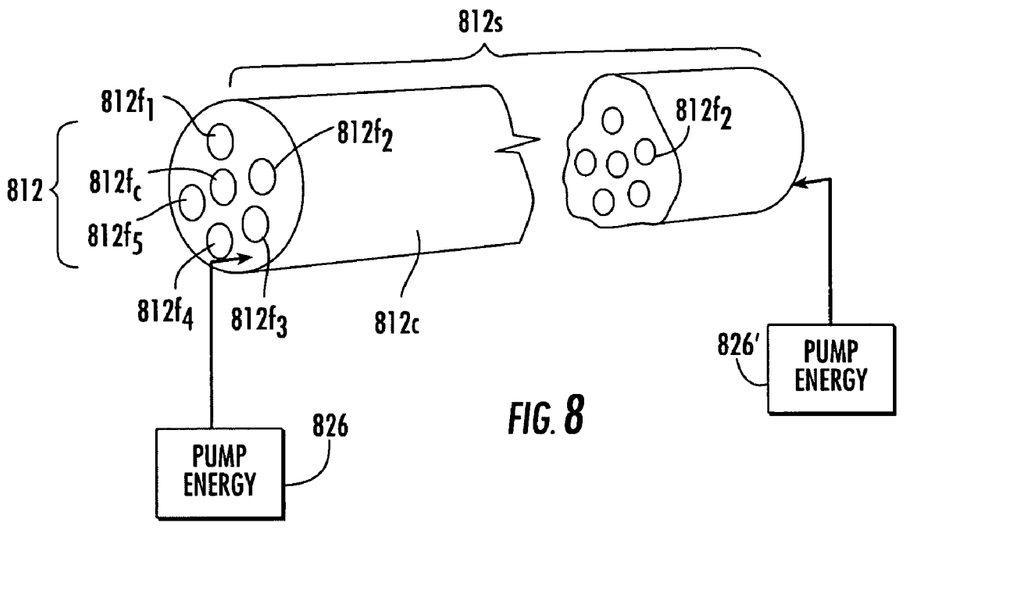
FIG. 8 is a simplified perspective or isometric view of a segment of a bundle of six amplifying optical fibers, including a central amplifying fiber and five peripheral fibers, all contained within a common cladding.

According to another aspect of the invention, a common cladding is used to allow the application of pump energy in common to a bundle of doped optical fibers. FIG. 8 is a simplified perspective or isometric view of a segment 812S of a bundle 812 of six amplifying optical fibers, including a central amplifying fiber 812fC and five peripheral fibers $812f_1$, $812f_2$, $812f_3$, $812f_4$, and $812f_5$. The bundle 812 of amplifying optical fibers is contained within a common cladding 812C. The common cladding allows pump energy to be applied in common to all the amplifying fibers 812fC, $812f_1$, $812f_2$, $812f_3$, $812f_4$, and $812f_5$ with but a single pump connection, such as the connection of pump block 826 to the cladding at the near end of the segment 812S of fiber bundle 812 of FIG. 8. Of course, additional pump connections can be made to the common cladding 812C, as suggested by pump block 826' coupled to the remote end of fiber bundle segment 812S. The bundle 812 of amplifying optical fibers is subject to the same problems of compression and tension described in conjunction with FIG. 4, and the same technique of twisting in conjunction with winding may be used to ameliorate such problems.

Figure 9A:
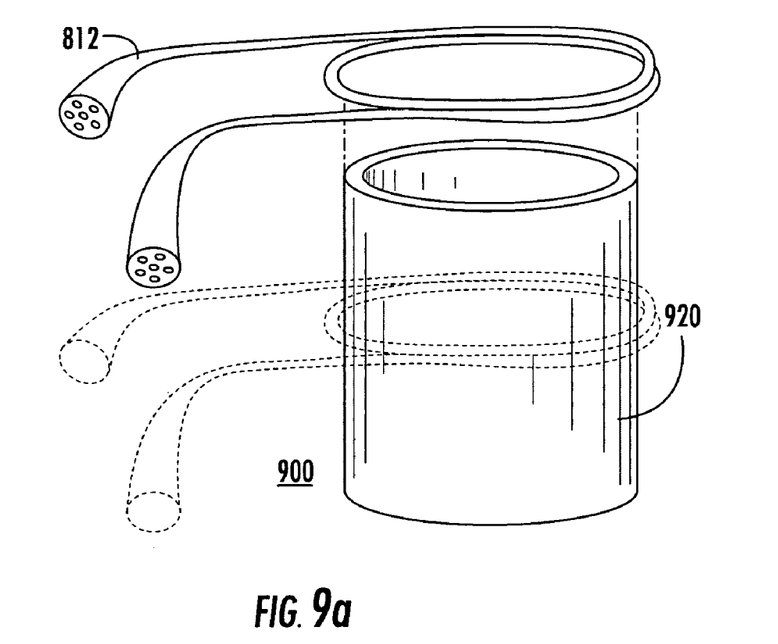
FIGS. 9*a*, 9*b*, 9*c*, and 9*d* represent steps in the fabrication of an amplifying optical fiber bundle which can be pumped as a whole.
Figure 9B:
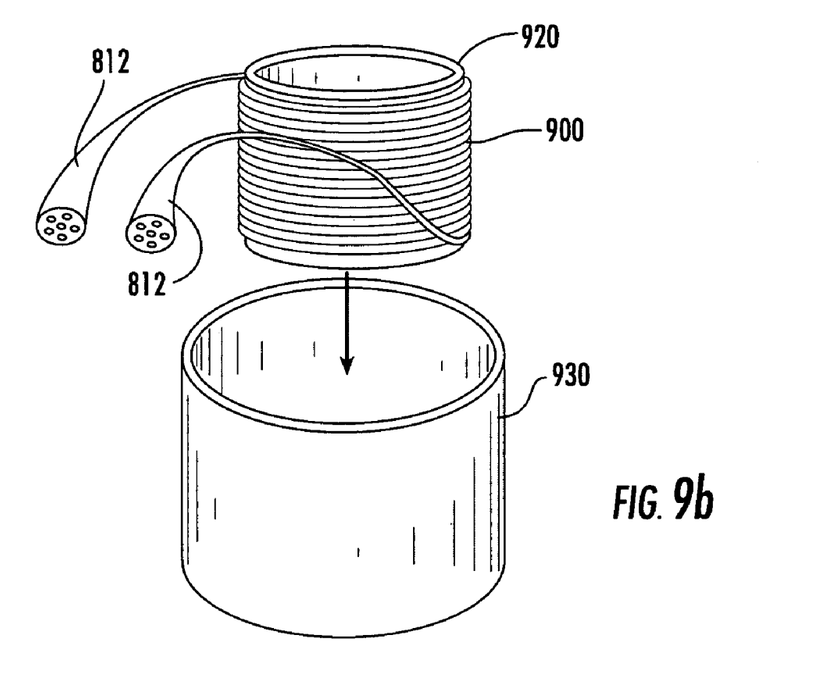
Figure 9C:
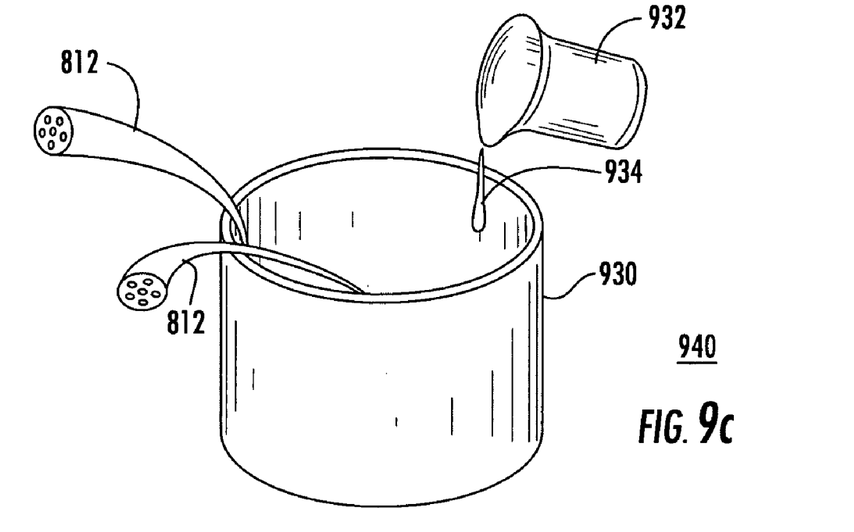
Figure 9D:
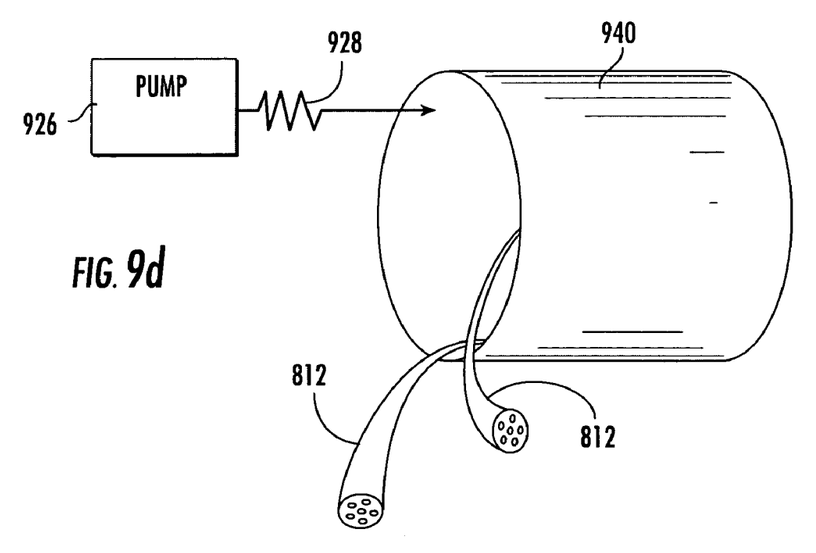

FIG. 9a represents a step toward fabrication of an amplifying optical fiber bundle which can be pumped as a whole. In FIG. 9a, an optical fiber bundle with common cladding, designated 812 to correspond to the segment illustrated in FIG. 8, is wound about a cylindrical core 920, which is made from a material which has the same index of refraction as the cladding 812C of bundle 812. The winding of the bundle 812 about cylinder 920 may be helical or some other type of winding, but should be twisted about its longitudinal axis during the winding, as described in conjunction with FIGS. 4 and 5. When the winding is completed, the winding-core arrangement 900 of FIG. 9a is placed within a container 930, as suggested in FIG. 9b. The container is then filled with a liquid material which, when cured or hardened, has an index of refraction which is near that of the cladding. In FIG. 9c, the filling is represented by a beaker 932 pouring a liquid 934. The fill material is thereafter cured or hardened, to thereby form a winding of an optical fiber bundle encapsulated in a common cladding, designated generally as 940 in FIG. 9c. As illustrated in FIG. 9d, the structure 940 may be pumped with a source of light, as suggested by pump source 926 and the photon symbol 928 directed toward the structure 940. The pump energy propagates through the hardened fill material and the common cladding 812C, and provides the energy for the amplifying optical fibers contained within the common cladding 812C.

Other embodiments of the invention will be apparent to those skilled in the art. For example, while single-layer or solenoidal helical wrapping of the optical fiber bundles has been illustrated in FIGS. 4, 5, and 7, multilayer windings may be used. While the illustrations show optical fiber bundles of six individual fibers, more or fewer fibers can be used, and the pentagonal disposition of five fibers surrounding a central fiber is not critical; any disposition, other than a flat or in-line disposition, can be used in conjunction with the twisting of the bundle at each turn. Similarly, while one twist of the bundle with each turn has been illustrated, the twist may be more or less gradual. It is sufficient if, over the length of the optical fiber bundle, the compression and tension are approximately equal, so that the velocity of propagation in the various strands is substantially equalized. The electrical output ports ($220_1 o$, $220_2 o$, $220_3 o$, . . . , $220_N o$), respectively, of detectors ($220_1$, $220_2$, $220_3$, . . . , $220_N$) of FIG. 2 may be disconnected from or reconnected to the electrical summing arrangement 230 as may be required to improve the signal-to-noise ratio or the signal level within the corresponding optical fibers ($218_1$, $218_2$, $218_3$, . . . , $218_N$) to further improve the signal-to-noise ratio. The pump level may be adjusted for each individual fiber to tune or adjust the propagation velocity through the various amplifying optical fibers ($218_1$, $218_2$, $218_3$, . . . , $218_N$) to tend to equalize the time of arrival at the detector bank 200 of FIG. 2 of the information signals. The amplifying optical fibers may be fed from, or feed, a telescopic power splitter or summer, such as a Cassegrain system, as may be necessary or desirable for free-space wireless transmission of light beams.

A communication system (200) according to an aspect of the invention is for transmitting information from a source of information (15) to a utilization device. The system (200) comprises a source (12, 14, 216) of first plurality (N) of light beams, each of which light beams carries the same information. The system (200) also includes a plurality of amplifying optical fibers ($218_1$, $218_2$, $218_3$, . . . , $218_N$). Each of the amplifying optical fibers ($218_1$, $218_2$, $218_3$, . . . , $218_N$) defines an input port ($218_1 i$, $218_2 i$, $218_3 i$, . . . , $218_N i$) coupled to one of the light beams of the source of plural light beams (12, 14, 216), for receiving and propagating a light beam. Each of the plurality of amplifying optical fibers ($218_1$, $218_2$, $218_3$, . . . , $218_N$) also defines an output port ($218_1 o$, $218_2 o$, $218_3 o$, . . . , $218_N o$) at which the propagating light beam is manifested. The system (200) includes a plurality, equal to the first plurality (N), of light-to-electric converters or detectors (220). Each of the light-to-electric converters ($220_1$, $220_2$, $220_3$, . . . , $220_N$) includes a light input port ($220_1 i$, $220_2 i$, $220_3 i$, . . . , $220_N i$) coupled to an output port ($218_1 o$, $218_2 o$, $218_3 o$, . . . , $218_N o$) of a corresponding one of the amplifying optical fibers ($218_1$, $218_2$, $218_3$, . . . , $218_N$), for receiving the manifested light therefrom, and also includes an electrical output port ($220_1 o$, $220_2 o$, $220_3 o$, . . . , $220_N o$), for producing at the electrical output port an electrical signal including the information carried on the light beam of the associated amplifying optical fiber and also including noise attributable to the amplification, which noise differs from fiber to fiber. The system (200) further includes electrical summing means (230) coupled to the electrical output ports ($220_1 o$, $220_2 o$, $220_3 o$, . . . , $220_N o$) of each of the detectors ($220_1$, $220_2$, $220_3$, . . . , $220_N$), for summing together the electrical signals including the information and the noise, for thereby tending to average the noise for improving the signal-to-noise ratio of the amplified signal.

In one embodiment of this aspect of the invention, the plural light beams comprise mutually parallel light beams. The plural light beams may be generated from a single modulated light beam (12, 14) by splitting (216) the modulated light beam.

According to another aspect of the invention, the plural optical fibers ($218_1$, $218_2$, $218_3$, . . . , $218_N$) are joined to form a flat tape (612) or a bundle (412, 812). If the optical fibers are in tape (612) form, they are spirally wrapped (FIG. 6b), and if in bundle form (412, 812), are wrapped in a manner which tends to equalize compressive and tension forces among the optical fibers of the bundle. In one version of the bundle wrapping, the optical fibers are wrapped about a cylinder (420, 520, 920), whether an imaginary cylinder or a cylindrical mandrel. In a preferred version of this aspect of the invention, the wrapping of the bundle (412, 812) about a cylinder (420, 520, 920) has the property of a selected rate of fiber bundle twist per turn about the cylinder, and the most preferred version has a wrapping of the bundle of fibers at a rate greater than about one twist per turn about the cylinder.

According to a further aspect of the invention, each of the bundles (412) of optical fibers comprises a bundle of core-clad combinations, and each of the core-clad combinations comprises an optical core (18f) capable of gain and a cladding (18C) through which pump energy can be introduced to the core (18f). According to a yet further aspect of the invention, each of the bundles (812) of optical fiber comprises a bundle of spaced-apart cores (812fc, 812f1, 812f2, 812f3, 812f4, 812f5) enveloped in a common cladding 812C) to support injection of pump energy to the bundle (812fc, 812f1, 812f2, 812f3, 812f4, 812f5) of spaced-apart cores. The injection of pump energy may be end injection, and the end injection of pump energy may be accomplished at plural locations along the cladding. The plural locations may be the two ends of the cladding or common cladding.

What is claimed is:

1. A communication system for transmitting information from a source of information to a utilization device, said system comprising:

a source of a first plurality of light beams, each of said light beams carrying the same information;

a plurality of amplifying optical fibers, each of said amplifying optical fibers of said plurality defining an input port coupled to one of said light beams of said source of plural light beams for receiving and propagating a light beam, each of said plurality of optical fibers also defining an output port at which said propagating light beam is manifested;

a plurality, equal to said first plurality, of light-to-electric converters, each of said light-to-electric converters including a light input port coupled to an output port of a corresponding one of said optical fibers, for receiving said manifested light therefrom, and also including an electrical output port, for producing at said electrical output port an electrical signal including said information and also including noise attributable to said amplification, which noise differs from fiber to fiber; and electrical summing means coupled to said electrical output ports of each of said light-to-electric converters, for summing together said electrical signals including said information and said noise, for thereby tending to average said noise for improving the signal-to-noise ratio.

2. A communication system according to claim 1, wherein said plural light beams comprise mutually parallel optical light beams.

3. A communication system according to claim 1, wherein said source of plural light beams comprises:

a single light beam modulated with said information; and a light splitting arrangement coupled to said single light beam for generating said plural light beams.

4. A communication system according to claim 1, wherein said optical fibers:

if in tape form, are spirally wrapped; and if in bundle form, are wrapped in a manner which tends to equalize compressive and tension forces among the optical fibers of said bundle.

5. A communication system according to claim 4, wherein said optical fibers are in bundle form, and are wrapped in a manner defining a cylinder.

6. A communication system according to claim 4, wherein said optical fibers are in bundle form, and are wrapped about the exterior of a cylinder.

7. A communication system according to claim 5, wherein said wrapping of said bundle in a manner defining a cylinder has the property of a selected rate of fiber bundle twist per turn about said cylinder.

8. A communication system according to claim 7, wherein said wrapping of said bundle is at the rate of greater than about one twist per turn about said cylinder.

9. A communication system according to claim 7, wherein said cylinder is a mandrel, and said mandrel has uniform thermal conduction characteristics across its surface.

10. A communication system according to claim 1, wherein each of said plurality of optical fibers comprises a bundle of core-clad combinations, each of said core-clad combinations comprising an optical core capable of gain and a cladding through which pump energy can be introduced to said core.

11. A communication system according to claim 1, wherein each of said plurality of optical fibers comprises a bundle of spaced-apart cores enveloped in a common cladding to support end injection of pump energy to said bundle of spaced-apart cores.

12. A communication system according to claim 11, further comprising pump energy coupling means coupled to said common cladding.

13. A communication system according to claim 12, wherein said pump energy coupling means is coupled to said common cladding at plural locations.

14. A communication system according to claim 13, wherein said pump energy coupling means is coupled to said common cladding at first and second ends of said cladding.

15. A communication system for transmitting information from a source of information to a utilization device, said system comprising:

a source of a first plurality of light beams, each of said light beams carrying the same information;

a plurality of amplifying optical fibers, each of said amplifying optical fibers of said plurality defining an input port coupled to one of said light beams of said source of plural light beams for receiving and propagating a light beam, each of said plurality of optical fibers also defining an output port at which said propagating light beam is manifested;

a plurality, equal to said first plurality, of detectors, each of said detectors including a light input port coupled to an output port of a corresponding one of said optical fibers, for receiving said manifested light therefrom, and also including an electrical output port, for producing at said electrical output port an electrical signal including said information and also including noise attributable to said amplification, which noise differs from fiber to fiber; and electrical summing means coupled to said electrical output ports of each of said detectors, for summing together said electrical signals including said information and said noise, for thereby tending to average said noise for improving the signal-to-noise ratio.

* * * * *